US012587809B2

(12) United States Patent
     Bealby

(10) Patent No.: US 12,587,809 B2
(45) Date of Patent: Mar. 24, 2026

(54) SYSTEMS, DEVICES, AND METHODS FOR INVENTORY MANAGEMENT VIA EQUIPMENT TRACKING

(71) Applicant: Electro Rent Corporation, West Hills, CA (US)

(72) Inventor: Tim Bealby, Harrow (GB)

(73) Assignee: Electro Rent Corporation, West Hills, CA (US)

( * ) Notice: Subject to any disclaimer, the term of this patent is extended or adjusted under 35 U.S.C. 154(b) by 412 days.

(21) Appl. No.: 18/209,873

(22) Filed: Jun. 14, 2023

(65) Prior Publication Data

US 2023/0403534 A1     Dec. 14, 2023

Related U.S. Application Data

(60) Provisional application No. 63/351,872, filed on Jun. 14, 2022.

(51) Int. Cl.
     *H04W 4/029* (2018.01)
     *G06K 7/10* (2006.01)
     *H04W 4/80* (2018.01)

(52) U.S. Cl.
     CPC ........ *H04W 4/029* (2018.02); *G06K 7/10366* (2013.01); *H04W 4/80* (2018.02)

(58) Field of Classification Search
     None
     See application file for complete search history.

(56) References Cited

U.S. PATENT DOCUMENTS

| | | | | |
|---|---|---|---|---|
| 8,766,794 B2 * | 7/2014 | Ferguson | ............. | G06Q 20/204 |
| | | | | 340/539.11 |
| 9,641,964 B2 | 5/2017 | Kulkarni et al. | | |
| 2009/0065578 A1 * | 3/2009 | Peterson | ............. | G05B 19/048 |
| | | | | 235/382 |
| 2021/0248283 A1 * | 8/2021 | Kincart | .................. | G06T 17/05 |

OTHER PUBLICATIONS

International Search Report and Written Opinion for PCT/US23/25301 mailed Sep. 12, 2023.

* cited by examiner

*Primary Examiner* — Adolf Dsouza

(74) *Attorney, Agent, or Firm* — Command IP LLP; Pejman Yedidsion

(57) ABSTRACT

Systems, devices, and methods for wirelessly locating and tracking a multitude of devices in real-time within a finite space, graphically representing the location of said devices, and deriving utilization of tracked assets being deployed within the space by utilizing one or more short-range wireless readers and one or more short-range wireless tags, collocated with a tracked device.

13 Claims, 9 Drawing Sheets

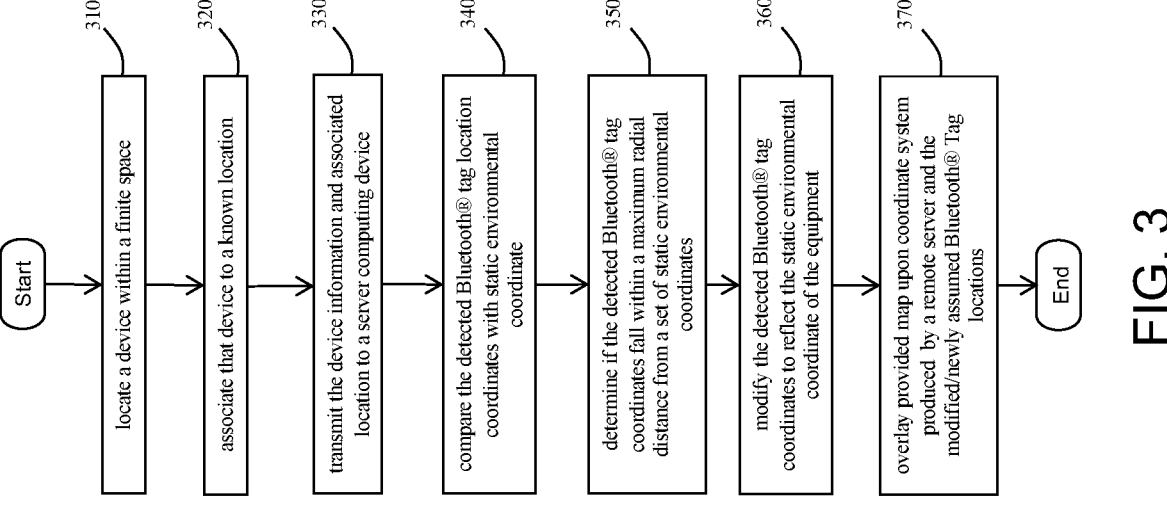

300

310 — locate a device within a finite space

320 — associate that device to a known location

330 — transmit the device information and associated location to a server computing device 340 — compare the detected Bluetooth® tag location coordinates with static environmental coordinate 350 — determine if the detected Bluetooth® tag coordinates fall within a maximum radial distance from a set of static environmental coordinates 360 — modify the detected Bluetooth® tag coordinates to reflect the static environmental coordinate of the equipment 370 — overlay provided map upon coordinate system produced by a remote server and the modified/newly assumed Bluetooth® Tag locations Start End

FIG. 3

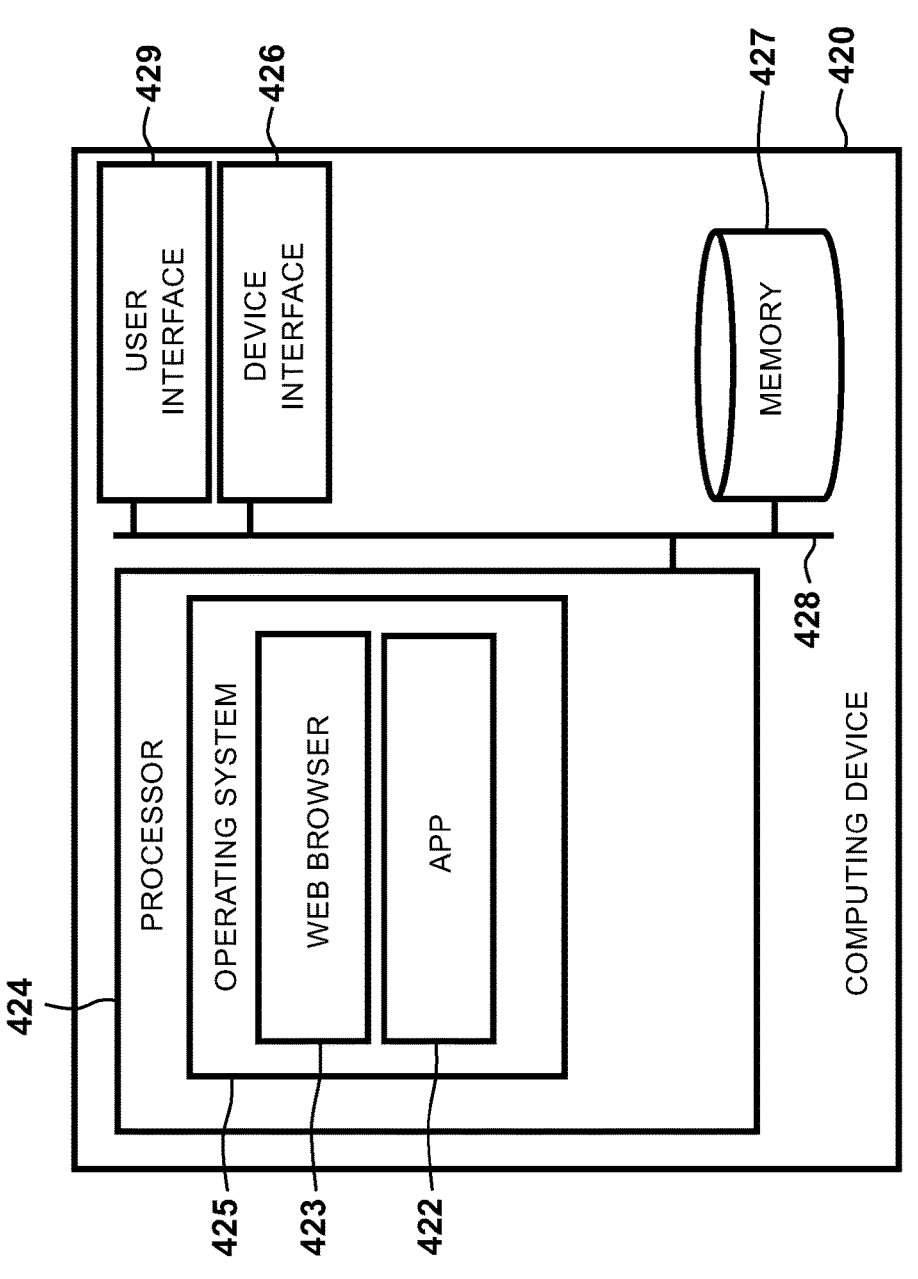
FIG. 4

500

508 Storage device

510 Removable Storage device

512 Communications interface

516 Communication link

514 Communication Infrastructure

502 Processor

506 Memory

504 Display device

511 User interface device

SYSTEMS, DEVICES, AND METHODS FOR INVENTORY MANAGEMENT VIA EQUIPMENT TRACKING

CROSS-REFERENCE TO RELATED APPLICATION

This application claims priority to and the benefit of U.S. Provisional Patent Application No. 63/351,872, filed Jun. 14, 2022, the contents of which are hereby incorporated by reference herein for all purposes.

TECHNICAL FIELD

Embodiments relate generally to locating objects, and more particularly to wirelessly locating devices.

BACKGROUND

Technology advancements have made leaps and bounds in every industry imaginable. From wireless communications and data transmission, to supercomputing, technology and the equipment that supports it are constantly changing and upgrading. For researchers and businesses to stay ahead of the changing landscape, they must use and maintain the latest equipment and test equipment. Constantly purchasing new equipment is usually not financially feasible for most companies. Therefore, renting equipment is an economical option for keeping up with technological changes.

As the need for more complicated test equipment has risen, so has the volume of devices used within a space. Server spaces, for example, have been known to house hundreds if not thousands of pieces of equipment, often situated on vertical racks and/or benches. The sheer amount of equipment within a space can make managing a large space daunting, and a headache to maintain, inventory, and/or locate each individual piece of equipment

SUMMARY

In a method embodiment for wirelessly locating and tracking a multitude of devices in real-time within a finite space and graphically representing the location of said devices, the method may include the following steps: placing one or more short-range wireless readers within said finite space; connecting the one or more short-range wireless readers to a Real-Time Location Server (RTLS) via a switch; collocating a short-range wireless tag device configured to transmit short-range wireless signals, with a desired tracked device; measuring, by the RTLS server, signal metrics from the one or more short-range wireless readers; transferring the measured signal metrics to a database server; establishing, by the database server, a coordinate system origin and plot location based on the received measured signal metrics and a provided static environmental coordinate of a received short-range wireless tag device according to said coordinate system; comparing the received short-range wireless tag coordinates with a predetermined radius value and a set of static environmental coordinates related to known locations within the finite space, and modifying the received short-range wireless tag coordinates to match those of the provided static environmental coordinate that the short-range wireless tag coordinates fell within the radius value distance of; and transmitting to and displaying on a client portal, a plotted representation of the modified short-range wireless tag coordinates, overlaid onto a client provided static environment.

The method may also include where the one or more short-range wireless readers may be Bluetooth® readers. Additionally, the short-range wireless tag device may be a Bluetooth® tag device and a wireless method to locate and track a multitude of devices may include a standard for Bluetooth® communications. The method may also be where a wireless method to locate and track a multitude of devices further comprises standard Wi-Fi communications.

The method may also include an embodiment where the Bluetooth® readers may be connectively connected to a switch which is further connected to a RTLS server. The method may also be where the collected and measured signal metrics comprises at least one of: a date/time stamp, a unique Bluetooth® tag identification number, a signal strength measurement, and a signal angle. In one embodiment, an established coordinate system may comprise X, Y, and Z axis values.

A system embodiment may comprise a Real-Time Location Server (RTLS) including a processor and addressable memory and a database server including a processor and addressable memory, where: the RTLS server may be configured to: communicate with one or more short-range wireless readers within a finite space via a switch; where the one or more short-range wireless readers may be configured to receive signals from a short-range wireless tag device, the short-range wireless tag device configured to transmit short-range wireless signals and associated with a desired tracked device; measure signal metrics from the one or more short-range wireless readers; transmit the measured signal metrics to a database server; and where the database server may be configured to: establish a coordinate system origin and plot location based on the received measured signal metrics and a provided static environmental coordinate of a received short-range wireless tag device according to said coordinate system; compare the received short-range wireless tag coordinates with a predetermined radius value and a set of environmental coordinates related to known locations within the finite space, and modify the received short-range wireless tag coordinates to match those of the provided static environmental coordinate that the short-range wireless tag coordinates fell within the radius value distance of, and transmit to and display on a client portal, a plotted representation of the modified short-range wireless tag coordinates, overlaid onto a client provided static environment, thereby wirelessly locating and tracking a multitude of devices in real-time within a finite space and graphically representing the location of said devices.

A method embodiment may include: detecting one or more short-range wireless readers placed within a finite space, where the one or more short-range wireless readers may be in communication with a Real-Time Location Server (RTLS); collocating a short-range wireless tag device configured to transmit short-range wireless signals with a desired tracked device;

collecting, by the RTLS server, signal metrics from the one or more short-range wireless readers; determining short-range wireless tag coordinates of the short-range wireless tag device based on a coordinate system origin and plot location, the received collected signal metrics, and a provided static environmental coordinate associated with the short-range wireless tag device according to the coordinate system; transmitting the determined short-range wireless tag coordinates to a database server; comparing, by the database server, the determined short-range wireless tag coordinates with a predetermined radius value associated with a set of static environmental coordinates related to one or more known device bench locations within the finite space; and modifying the determined short-range wireless tag coordinates to match those of the provided static environmental coordinate, where the modified short-range wireless tag coordinates may be located within the predetermined radius value thereby wirelessly locating and tracking a number of tracked devices in real-time within the finite space.

Additional method embodiments may include: transmitting, by the database server, to a client portal, a plotted representation of the modified short-range wireless tag coordinates, overlaid onto a client provided static environment. In additional method embodiments, the one or more short-range wireless readers comprise a plurality of Bluetooth® readers. In additional method embodiments, the short-range wireless tag device may be a Bluetooth® tag device.

Additional method embodiments may include: transmitting, by the short-range wireless tag device, signal metrics specific to the short-range wireless tag device to the one or more short-range wireless readers. In additional method embodiments, the collected signal metrics transmitted by the short-range wireless tag device comprise at least one of: a date/time stamp, a unique short-range wireless tag identification number, a signal strength measurement, and a signal angle. In additional method embodiments, the coordinate system comprises X, Y, and Z axis values.

Additional method embodiments may include: disregarding the short-range wireless tag coordinates if the short-range tag coordinates may be located outside the predetermined radius value of the set of static environmental coordinates. In additional method embodiments, location and quantity of the one or more short-range wireless readers to track the desired tracked device in the finite space may be determined based on a predetermined minimum value and a predetermined maximum value that may be based on a square-footage of the finite space.

In additional method embodiments, if the database server does not receive an expected short-range wireless tag location within a specified amount of time, the database server begins interrogating a collocated Internet of Things (IoT) device for location information. In additional method embodiments, if the collocated IoT device may be not detected for specific tracked device, the database server searches for an alternative tracked device that may be still transmitting location information of the short-range wireless tag device.

In additional method embodiments, if the database server receives a short-range wireless tag location of a specific tracked device outside of a specified range or perimeter, the database server begins interrogating the collocated IoT device for location information, and where if the collocated IoT device may be not detected for the tracked device, the database server transmits a notice of at least one of: an unauthorized removal and a theft.

Additional method embodiments may include: comparing the determined short-range wireless tag coordinates with a predetermined radius value, where the predetermined radius value may be a minimum distance value; associating the determined short-range wireless tag coordinates with the static environmental coordinates, if the determined short-range wireless tag coordinates fall within the minimum distance value; and disregarding the determined short-range wireless tag coordinates, if the determined short-range wireless tag coordinates fall outside of the minimum distance value.

In additional method embodiments, if the determined short-range wireless tag coordinates fall outside of the minimum distance value, using location coordinates of a known associated tracked device instead, thereby predicting coordinates of the tracked device being at possible locations having a higher likelihood of physical correlation with the provided static environment.

A system embodiment may include: a plurality of Bluetooth® readers systematically placed within a predetermined distance and range from each other and from a Bluetooth® tag in a finite space; a tracked device collocated to the Bluetooth® tag, where the Bluetooth® tag may be configured to transmit signal metrics; a switch configured to couple the plurality of Bluetooth® readers to a Real-Time Location Server (RTLS); where the RTLS may be configured to: communicate with the plurality of Bluetooth® readers within the finite space via the switch, where the plurality of Bluetooth® readers may be configured to receive signal metrics from the Bluetooth® tag, and where the Bluetooth® tag may be configured to transmit short-range wireless signals and the signal metrics; collect the received signal metrics, the received signal metrics comprising at least one of: a unique identifier and a timestamp; measure the signal metrics received from the plurality of Bluetooth® readers; determine a location of the tracked device based on the measured signal metrics; generate a set of X, Y, and Z coordinates of the Bluetooth® tag location using the determined location of the tracked device and the measured signal metrics; and transmit the generated set of X, Y, and Z coordinates and measured signal metrics to a database server; where the RTLS using the measured signal metrics detects a unique identification number and a date/timestamp corresponding to an instance of transmission, where the unique identification number may be associated with the tracked device; one or more database servers configured to: receive signal metrics from the RTLS to triangulate and calculate an angle of attack in which the Bluetooth® tag signal was received; establish a coordinate system with origin and plot location based on the received measured signal metrics and a provided static environmental coordinate of a short-range wireless tag device according to the established coordinate system; compare the received Bluetooth® tag coordinates with a predetermined radius value and a set of environmental coordinates related to known locations within the finite space, and modify the received Bluetooth® tag coordinates to match those of the provided static environmental coordinate that the Bluetooth® tag coordinates may be within a radius value distance; and transmit, to a client portal, a plotted representation of the modified Bluetooth® tag coordinates, overlaid onto a client provided static environment.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 3 depicts a flowchart of the method for locating and tracking a multitude of devices in real-time;

FIG. 4 illustrates an example of a top-level functional block diagram of a computing device embodiment;

DETAILED DESCRIPTION

Figure 1:
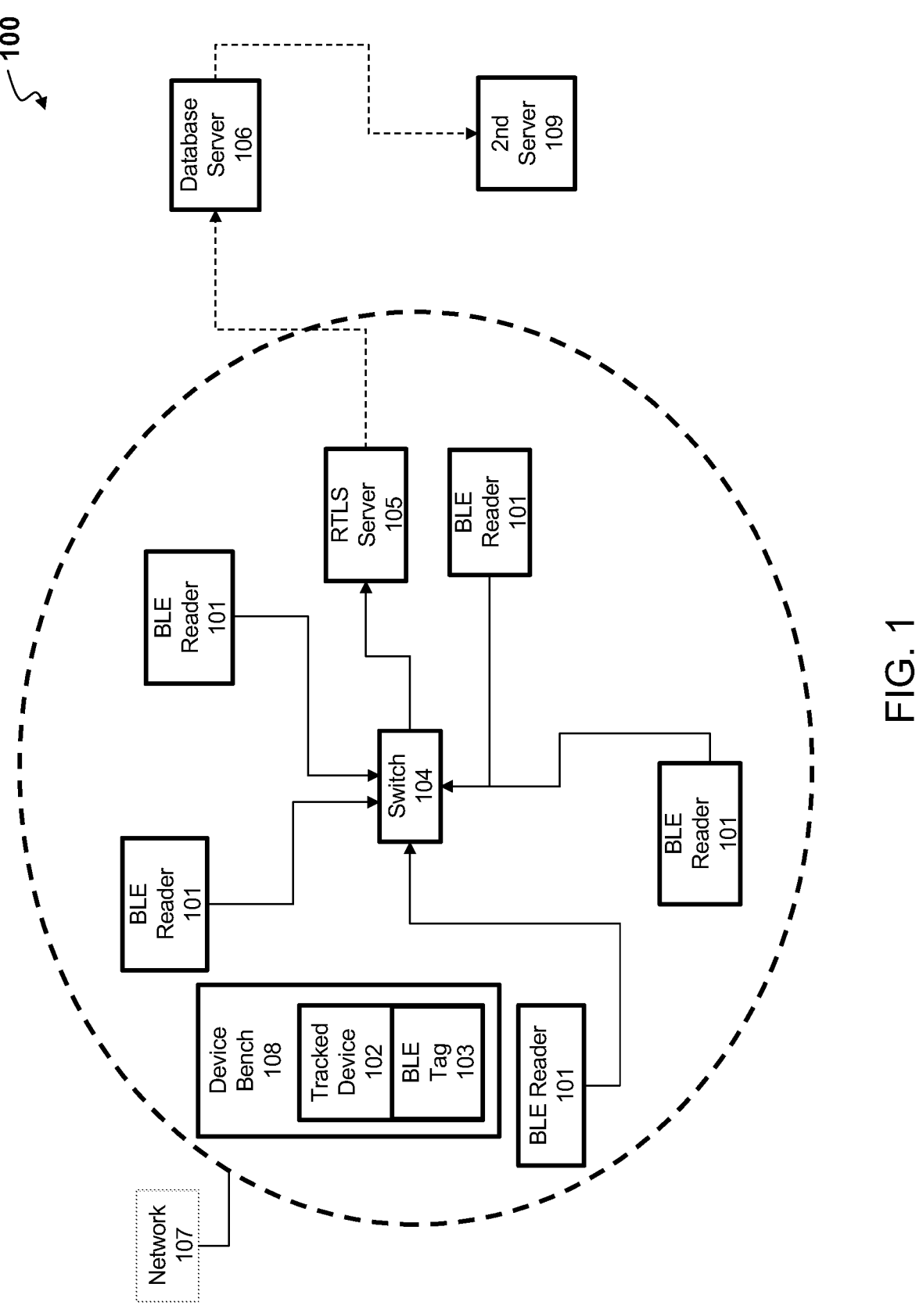
FIG. 1 depicts a high-level functional block diagram of a system designed to locate a device within a finite space and associate that device to a known location.

It is vital for rental test equipment companies to maintain accountability for equipment at all times. Methods of recording renting entity information are needed to determine the whereabouts of a rented piece of equipment. This left the responsibility of security and accountability of a rented piece of equipment up to the renting party, creating opportunities for theft and loss of equipment. Costs associated with the loss or theft of a piece of equipment also play a large factor in profits and liability. As equipment complexity increases, the cost of each piece of equipment also increases, making the purchase of new equipment after a loss or theft difficult for a rental business model. Specifically, in the test equipment rental and management industry, there is a need to not only track the location of a piece of equipment within a confined space, but map and monitor their location in a real-time and space domain.

One aspect of the present embodiments includes a system designed to locate a device within a finite space and associate that device to a known location. This system may include a multitude of short-range wireless readers, at least one wireless transmitter, e.g., Bluetooth® tag, a switch, a local Real-Time Location Server (RTLS), a remote server, and a client portal. In one embodiment, the Bluetooth® tag transmits a signal, according to standard Bluetooth® communication standards, where multiple short-range wireless readers, e.g., Bluetooth® readers, receive and detect the Bluetooth® tag's transmitted signal. In other embodiments, the short-range wireless communication method for the tags and readers, may be one of, but not limited to an: Ultra-Wideband (UWB), Z-Wave®, ZigBee®, Bluetooth® LE (BLE), IPv6 over Low-Power Wireless Personal Area Networks (6LoWPAN), Thread®, WiFi-ah, NFC, Weightless-N protocol, or any comparable technology. The Bluetooth® readers, which are connected to a RTLS via a switch, transmit the detected Bluetooth® tag signal via communication protocols. The RTLS, using the received tag information, generates an X, Y, and Z coordinate of the Bluetooth® tag location and sends the coordinates over intranet or internet to the remote server. At the remote server, the coordinates are compared with pre-measured static environmental coordinates. Using a minimum radius distance, the remote server then associates the Bluetooth® tag coordinates with the static coordinates, ignoring those Bluetooth® tag coordinates that do not fall within the minimum radius distance of the static coordinates. Finally, this information is served to a client portal where it is graphically depicted overlaying a client provided floorplan with the plotted equipment and Bluetooth® tag locations.

Another aspect of the embodiments includes a system where an IoT tracker is collocated with a Bluetooth® tag. In some embodiments, a system is disclosed where the client portal is configured to switch between a client provided floorplan and a global map according to the detected location of the Bluetooth® tag and/or associated IoT tracker. Another aspect of the embodiments includes a system where a multitude of Bluetooth® tags are used. Each Bluetooth® tag may be configured to transmit unique identifying information and timestamp information. Another aspect of the embodiments includes a system having a cloud server, where the cloud server may receive detected Bluetooth® tag signal information, process this information, and produce X, Y, and Z coordinates for the Bluetooth® tag location. The cloud server then transmits/sends the information to a remote server for further processing.

In one embodiment, a method may be designed to locate a device within a finite space and associate that device to a known location. The method may include receiving a transmitted Bluetooth® tag signal at a Bluetooth® reader and transmitting it to an RTLS where X, Y, Z coordinates are attributed to the detected Bluetooth® tag location. The Bluetooth® tag coordinates as well as a unique identifier, and a timestamp may be transmitted to a remote server. The remote server may compare the Bluetooth® tag coordinates with user provided coordinates and, using a minimum distance value, either associate the Bluetooth® tag coordinates with the static environmental coordinates, if the Bluetooth® coordinates fall within a minimum distance value, or disregard the Bluetooth® tag coordinates if the coordinates fall outside of the minimum distance value. The new coordinate information is then provided to a client portal where the coordinates are plotted against an origin created by the remote server and overlaid onto a user provided map.

In one aspect of the present embodiments, Bluetooth® coordinates which fall outside of the minimum distance value, may be plotted at an originally known location of an associated device, thereby displaying the equipment, e.g., tracked device, at locations having a higher likelihood of physical correlation with the provided static environment. That is, the system may adjust for and predict the location coordinates of the Bluetooth® tag in the static environment based on other known Bluetooth® coordinates of other Bluetooth® tags. Another aspect of the present embodiments may include a method where the RTLS attributed coordinates include coordinate system variables which may include theta, radians, a fourth dimension considering time, or other variables commonly used to describe an object's location in two-, three-, or four-dimensional space.

Another aspect of the present embodiments may include a method where if a remote server does not receive an expected Bluetooth® tag location within a specified amount of time, the remote server begins interrogating a collocated IoT device for location information. In this embodiment, if a collocated IoT device is not detected for that equipment, the remote server may look at alternative equipment that is still transmitting the Bluetooth® tag location information, where the other equipment has had a historical track of being in an approximate location as the equipment whose tag location was not received.

Another aspect of the present embodiments includes a method where if a remote server receives a Bluetooth® tag location outside a specified range or perimeter, the remote server begins interrogating a collocated IoT device for location information. In this embodiment, if a collocated IoT device is not detected for that equipment, the remote server may escalate this scenario and send a notice of an unauthorized removal or theft. Another aspect of the present embodiments includes a method where if a remote server detects a Bluetooth® tag outside a predetermined radius value of a static environmental coordinate, an alert is generated at a client portal. Another aspect of the present embodiments includes a method where if a remote server detects a Bluetooth® tag location outside a predetermined perimeter value, an alert is generated at the remote server, accessible by a user.

The present embodiments include a method designed to locate a device within a finite space and associate that device to a known location. The method includes a user providing a finite space map and floorplan dimensions to a remote server. Using the size dimensions of the floorplan, the remote server provides a recommended location and number of Bluetooth® readers necessary to track a desired number of equipment within the space.

One aspect of the present embodiments includes a system designed to execute the method steps to: locate a device within a finite space and associate that device to a known location. This system includes a multitude of short-range wireless readers. These readers may use a multitude of short-range IEEE communication standards including Zigbee® or Bluetooth®. The Bluetooth® readers, for example, will be situated throughout a finite space using predetermined minimum and maximum distance values to determine how many and where the readers will be situated within the space. This predetermined minimum and maximum value may be based on the square-footage of the confined space. The system may further include at least one Bluetooth® tag, which may be collocated with a desired piece of test equipment. The Bluetooth® tag may be configured to transmit unique identifying information specific to the tag following Bluetooth® communications standards. Some unique identifying information may include a unique identifying number and date/time stamp. The system may also include a switch where the Bluetooth® readers may be connected to the switch for transmitting data and data communications. The switch may be connected to and in communication with a local real-time location server (RTLS) which does not connect to the local internet or Wi-Fi. The method may also include providing a client, using a client portal, variable depictions of the location of the detected Bluetooth® tag, according to a variation of the minimum radius distance value.

When in operation, the Bluetooth® tag may be configured to transmit unique information which is detected and recorded by the multitude of Bluetooth® readers. This unique information is sent to a local real-time location server (RTLS). Unique identifying information recorded by the set of Bluetooth® readers may then be processed. Information such as signal strength and a detected Bluetooth® tag signal angle are determined and processed at the local (RTLS) and converted into X, Y, and Z coordinates. The system further includes a remote server which subsequently receives the processed Bluetooth® signal information comprising a date/time stamp, an X, Y, and Z coordinate, and a unique identifier of the detected Bluetooth® tag. Using a client submitted and scaled floorplan of the finite space, where the Bluetooth® tag and readers reside in, the remote server designates an origin for a coordinate system where the Bluetooth® tag coordinates may be plotted against.

In one embodiment, a set of static environmental coordinates related to an equipment or set of equipment of interest may be entered into the remote server, where a maximum radial distance value is also applied to each static environmental coordinate. The remote server may be configured to compare the detected Bluetooth® tag location coordinates with the static environmental coordinates and if the detected Bluetooth® tag coordinates fall within a maximum radial distance from a static environmental coordinate, the remote server modifies the detected Bluetooth® tag coordinates to reflect the static environmental coordinates of the equipment. Finally, the system may include a client portal, where the client provided floorplan is overlaid upon a remote server produced coordinate system and the new assumed Bluetooth® Tag locations.

In one embodiment, static environmental X, Y, Z coordinates are maintained in the remote server where, a minimum radius value is used to associate a detected tag location with a known client provided floorplan. If and/or when a detected tag location coordinate is within the maximum radius value of a known static environmental coordinate, the detected tag coordinate system is associated with the known client location and assumes the same coordinates of that location. Additionally, a client server is provided in the system which is configured to receive the information processed by the remote server and graphically displaying the information related to both the new assumed location of the detected tag and a client provided map or floorplan of the facility the Bluetooth® tag was placed in.

Another aspect of the present embodiments includes a system where a Bluetooth® tag is collocated with an IoT tracker on the equipment. A system and method for detecting and tracking the location of a desired object within a finite space or area is disclosed herein. When detected, the system and method may use collected measurement information to determine a location of a device or object, in reference to a coordinate system and a customer provided floor plan or map.

FIGS. 1-8 and the following discussion provide a brief, general description of a suitable computing environment in which aspects of the described technology may be implemented. Although not required, aspects of the technology may be described herein in the general context of computer-executable instructions, such as routines executed by a general—or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

FIG. 1, depicts a functional block diagram of an illustrative embodiment of the device detection system where the system 100 includes one or more short-range wireless receivers, e.g., Bluetooth® reader(s) 101, a tracked device 102, a Bluetooth® tag 103, a switch 104, a RTLS server 105, one or more database servers 106 and 109, and a wireless network 107. A plurality of Bluetooth® reader(s) 101 are systematically placed within a predetermined distance and range from each other and from a Bluetooth® tag 103. In some embodiments, the one or more Bluetooth® reader(s) 101 may utilize a standard for Bluetooth® communications and in other embodiments the readers may use other short-range technologies such as Zigbee® or Wi-Fi technologies.

The Bluetooth® tag 103, according to Bluetooth® communication specifications, may transmit information such as a unique identification number and a date/timestamp corresponding to the instance of transmission and the specific Bluetooth® tag itself. In some embodiments, other information may also be transmitted such as a detected motion capability embedded in the Bluetooth® tag, or detected distance to other Bluetooth® tags, etc.

In one embodiment, at least three Bluetooth® readers 101 are present and may be configured to receive the transmitted information from the Bluetooth® tag 103 in order to measure signal strength, send the detected signal information via a switch 104 to a RTLS server 105, and enable the system to triangulate and calculate the angle of attack in which the Bluetooth® tag 103 signal was received. In other embodiments, Bluetooth® tag information may also be transmitted to the RTLS server 105 via other methods including Wi-Fi, private network, other wireless network 107, or other methods disclosed herein. In one embodiment, a client portal may be connected to the system via a wireless network 107, where in some embodiments, the client portal may be a computing device, e.g., laptop, while other embodiments the client portal may be an internet accessible interface, or a mobile device accessible interface.

The RTLS server 105 may be configured to collect and process signal information received from each of the Bluetooth® readers 101 where the information is interpreted into X, Y, and Z coordinate values. The X, Y, and Z coordinate values corresponding to a detected location of the Bluetooth® tag 103, as well as additional unique identifying information and timestamp info, may be sent to a database server 106. In one embodiment, the database server 106 may be in communication with a second database server 109 forming a distributed computing system where the multiple computers work together to execute the disclosed steps, making the computer network appear as a powerful single computer that provides large-scale resources to deal with complex challenges. In one embodiment, the components, database server 106 and second database server 109, may be located on different networked computers, which communicate and coordinate their actions by passing messages to one another.

The database server 106 may be configured to compare the Bluetooth® tag location coordinates with static environmental coordinates of a device, where the static environmental coordinates may also be device bench coordinates which corresponds with a client device bench 108 location. According to the different embodiments of the database server 106, based on the comparison of the Bluetooth® tag location coordinates with static environmental coordinates, if an asset (e.g., equipment or device) is not within the radius of the bench or is within the radius of a storage area, then the system may infer that the asset is not being used. Additionally, an intended utilization may be determined for the asset based on whether the bench has been assigned to a project calendar and the system inferring that any asset/instrument in that bench radius is also being used and shares the same calendar. That is, the intended utilization may then be compared with a more accurate actual utilization determined via network/cable monitoring to provide an automatic identification, location, intended utilization, and actual utilization for each asset.

Figure 2A:
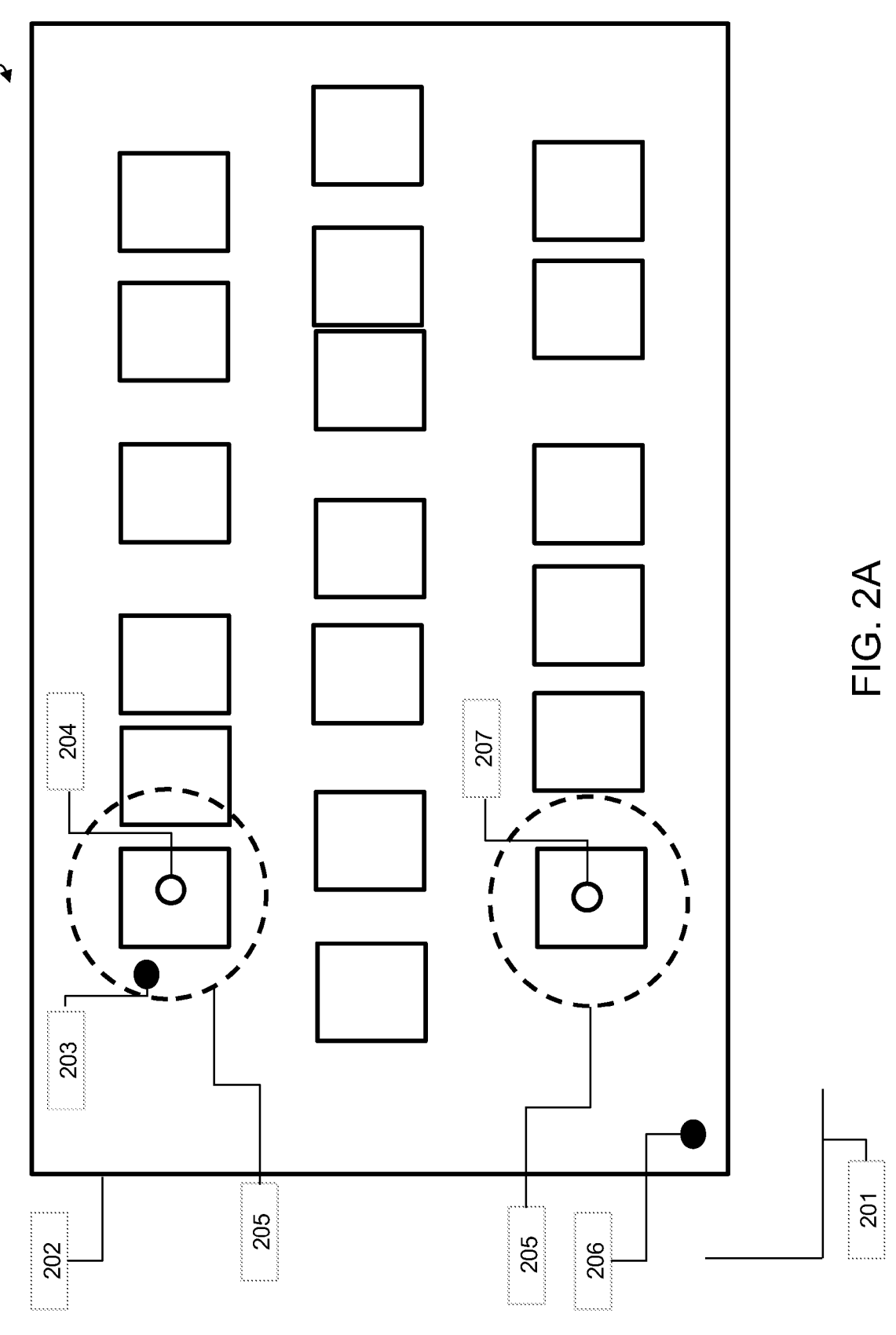
FIG. 2A depicts a client portal view of detected Bluetooth® tag locations overlaid onto a client provided floorplan.

Referring to FIG. 2A, the database server (106, FIG. 1) may be configured to compare the Bluetooth® tag location coordinates 203 with a predetermined radius value 205 which determines an acceptable radial distance from a set of static environmental coordinates, e.g., provided device bench coordinates 204 and client provided device bench coordinates 207. FIG. 2A, illustrates a client device bench 200, where Bluetooth® tag location coordinates 203 of a device fall within a predetermined radius value 205, while a Bluetooth® tag location coordinates 206 of another device fall outside the predetermined radius value 205. Also illustrated in FIG. 2A are the boundaries of the finite area 202 and a database server (106, FIG. 1) generated origin 201 symbolically illustrating how the origin 201 is used as reference for plotting other coordinates within the finite area 202.

Figure 2B:
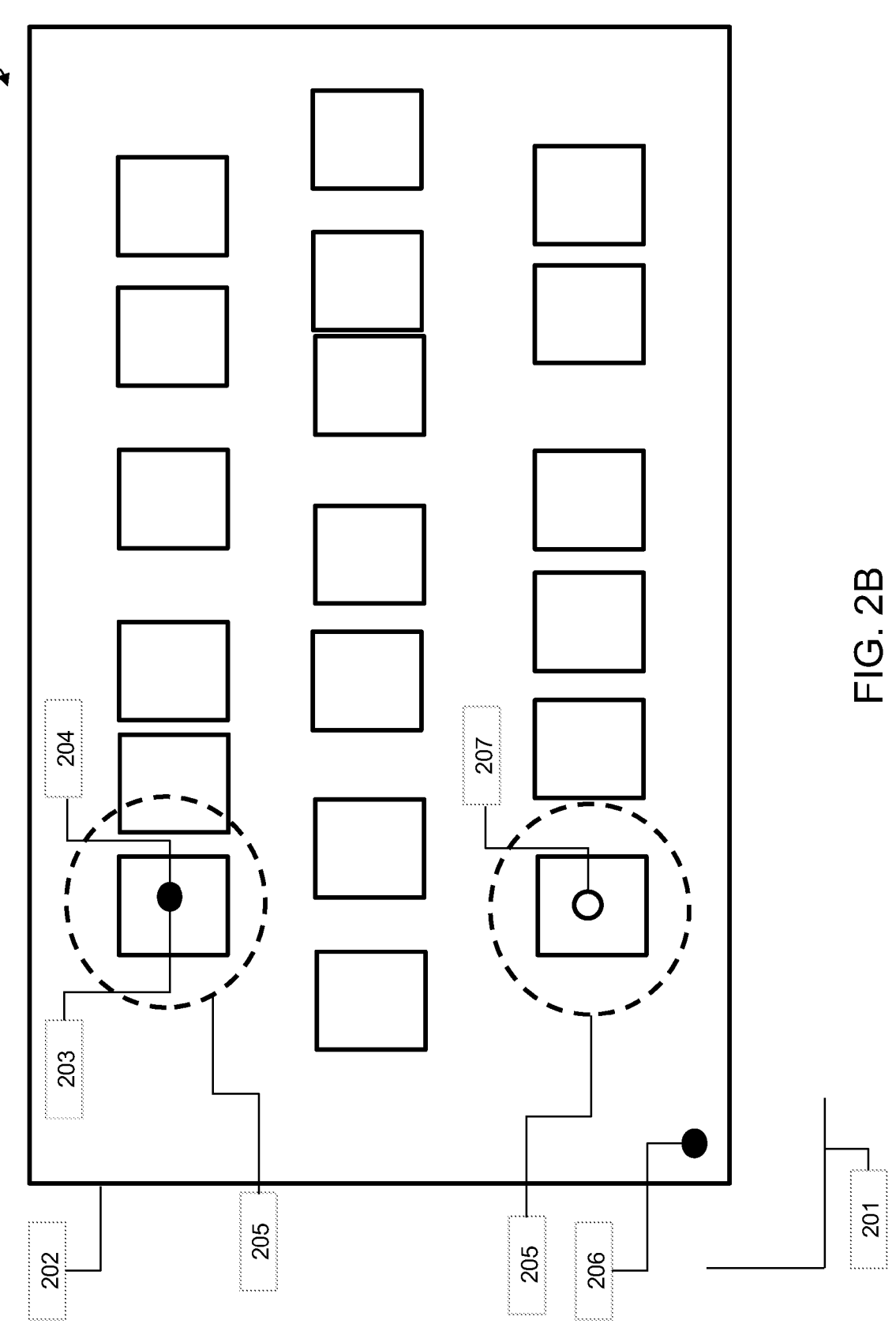
FIG. 2B depicts a client portal view of detected Bluetooth® tag locations overlaid onto a client provided floorplan.

FIG. 2B illustrates a client device bench 210 that represents a period after database server (106, FIG. 1) has compared and modified Bluetooth® tag location coordinates 203 and 206, as illustrated in FIG. 2A. The Bluetooth® tag location coordinates 203 have been modified to match the client provided device bench coordinates 204, while Bluetooth® tag location coordinates 206 which fell outside of a predetermined radius value 205, were not modified. That is, the Bluetooth® tag location coordinates 206 do not match the location coordinates of the client provided device bench coordinates 207.

The predetermined radius value 205 is a radius value which describes the distance from a device bench (108, FIG. 1) that accounts for measured Bluetooth® tag (103, FIG. 1) X, Y, and Z coordinate error (or other user defined variables). After processing by the database server (106, FIG. 1), the determined location data, e.g., the Bluetooth® tag location coordinates 203, is overlaid on a client provided map, which is scaled to the coordinate system previously generated internally by the database server (106, FIG. 1) and displayed at a client portal connected to the system via a wireless network.

FIG. 3 shows a flow chart 300 of the steps as executed by the disclosed systems and devices for inventory management via equipment tracking, where the steps include: locate a device within a finite space (step 310); associate that device to a known location (step 320); transmit the device information and associated location to a server computing device (step 330); compare the device information in the form of detected Bluetooth® tag location coordinates with static environmental coordinate of the equipment (step 340); determine if the detected Bluetooth® tag coordinates fall within a maximum radial distance from a set of static environmental coordinates (step 350); modify the detected Bluetooth® tag coordinates to reflect the static environmental coordinate of the equipment (step 360); and overlay a provided map of the known location upon a coordinate system generated by remote server and the newly assumed Bluetooth® Tag locations (step 370).

The techniques introduced herein may be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), and/or field-programmable gate arrays (FPGAs), etc.

FIG. 4 illustrates an example of a top-level functional block diagram of a computing device embodiment 400. The example operating environment is shown as a computing device 420 comprising a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 420, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 428. In some embodiments, via an operating system 425 such as one supporting a web browser 423 and applications 422, the processor 424 may be configured to execute steps of a process establishing a communication channel and processing according to the embodiments described above.

Figure 5:
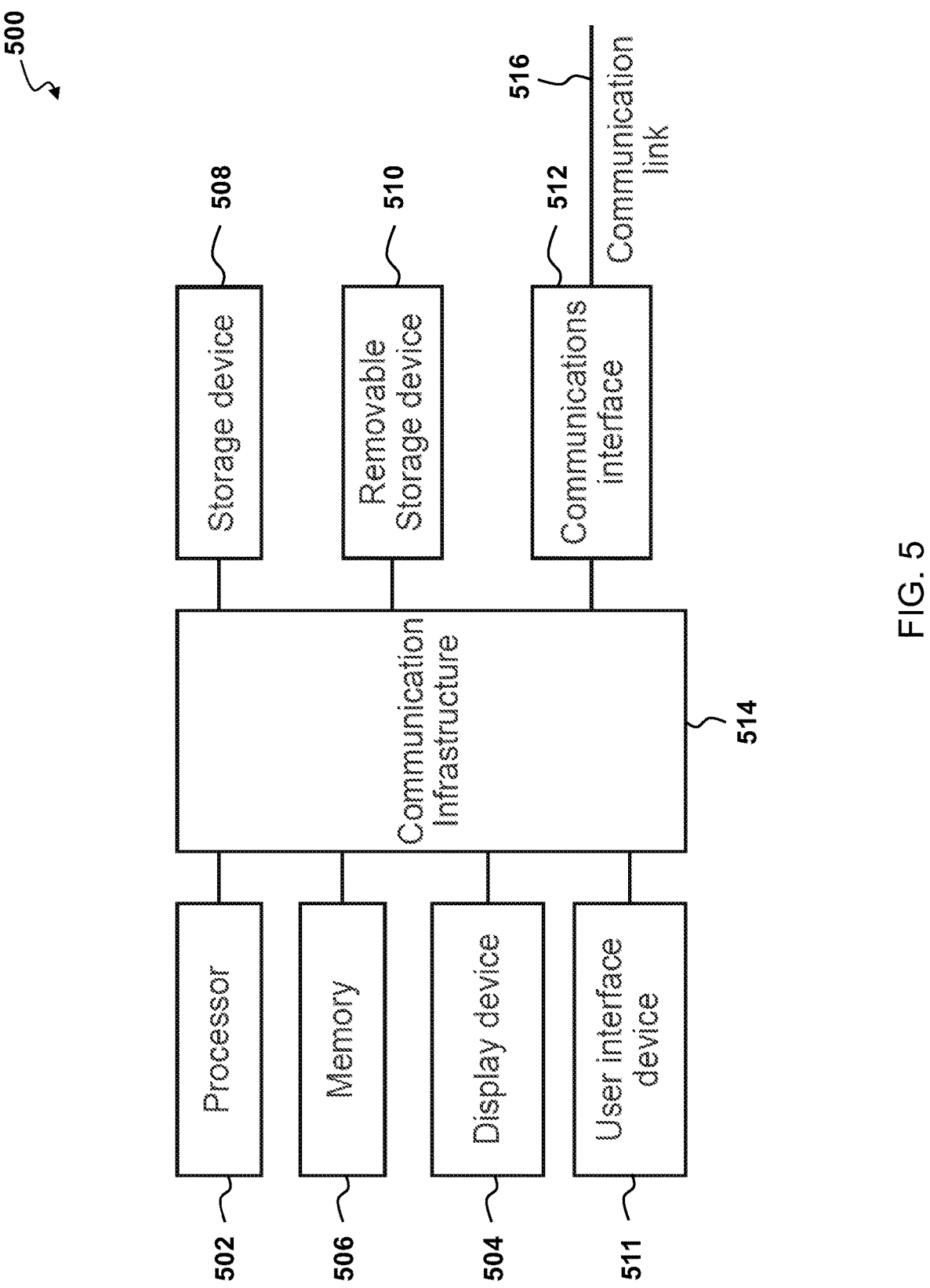
FIG. 5 is a high-level block diagram showing a computing system comprising a computer system useful for implementing an embodiment of the system and process.

FIG. 5 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transmitted, and thereby transferred, between the computer system and external devices. The system further includes a communications infrastructure 514 (e.g., a communications bus, cross-over bar, or network) to which the aforementioned devices/modules are connected as shown.

Information transmitted and transferred via communications 514 may be in the form of signals such as electronic, electromagnetic, optical, or other signals capable of being received by communications interface 514, via a communication link 516 that carries signals and may be implemented using wire or cable, fiber optics, a phone line, a cellular/ mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/ operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 6:
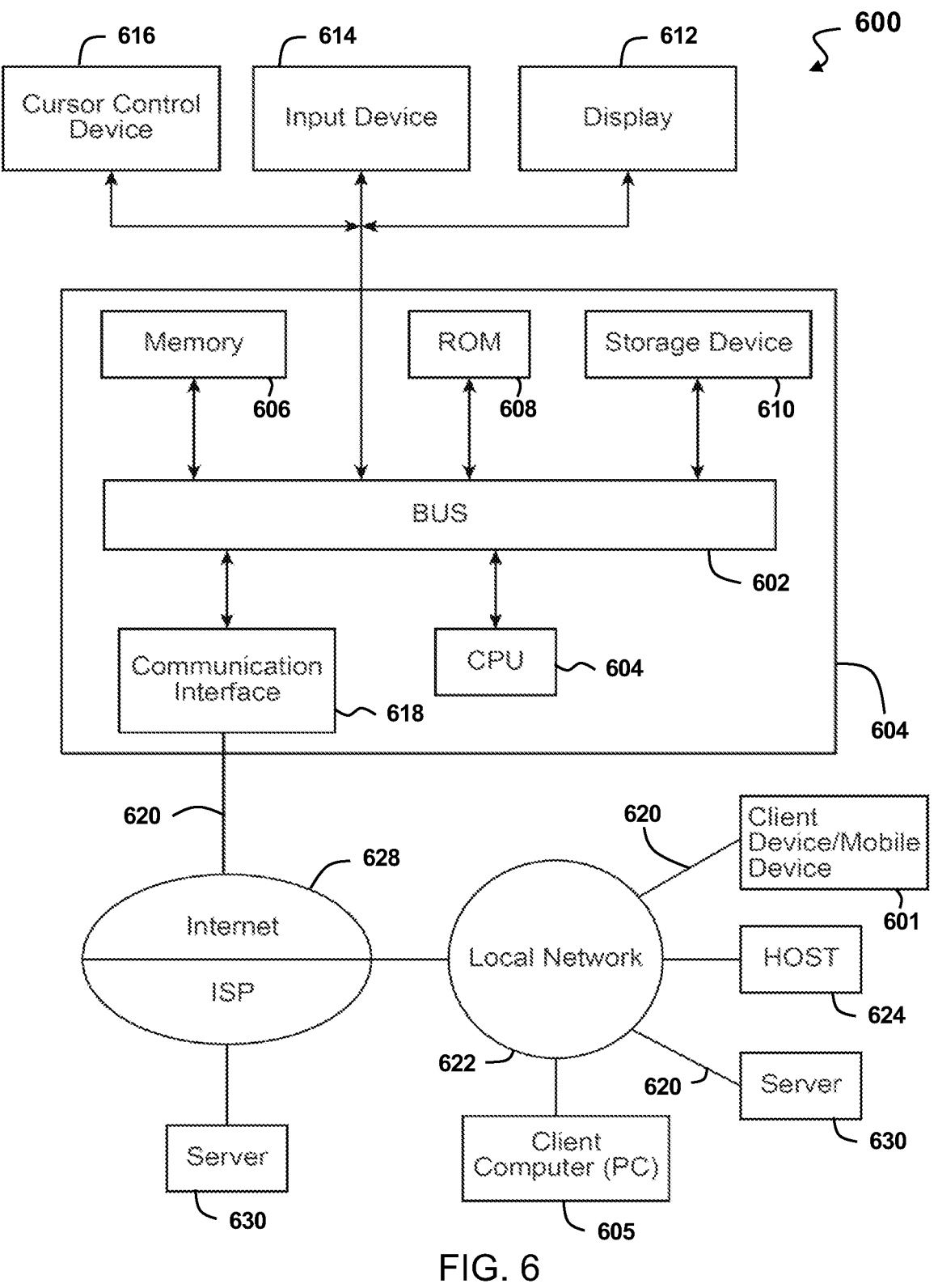
FIG. 6 shows a block diagram of an example system in which an embodiment may be implemented.

FIG. 6 shows a block diagram of an example system 600 in which an embodiment may be implemented. The system 600 includes one or more client devices 601 such as consumer electronics devices, connected to one or more server computing systems, such as server 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the processor/CPU 604, the main memory 606, video memory and the storage device 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type of user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor or multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms of carrier waves transporting the information.

In another embodiment of the server 630, the communication interface 618 is connected to a local network 622 via a network communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or local network 622, such as a LAN, for communication with the servers 630. The system 600 can further include client computers 605 (e.g., personal computers, computing nodes) operating in the same manner as client devices 601, where a user can utilize one or more client computers 605 to manage data in the server 630.

Figure 7:
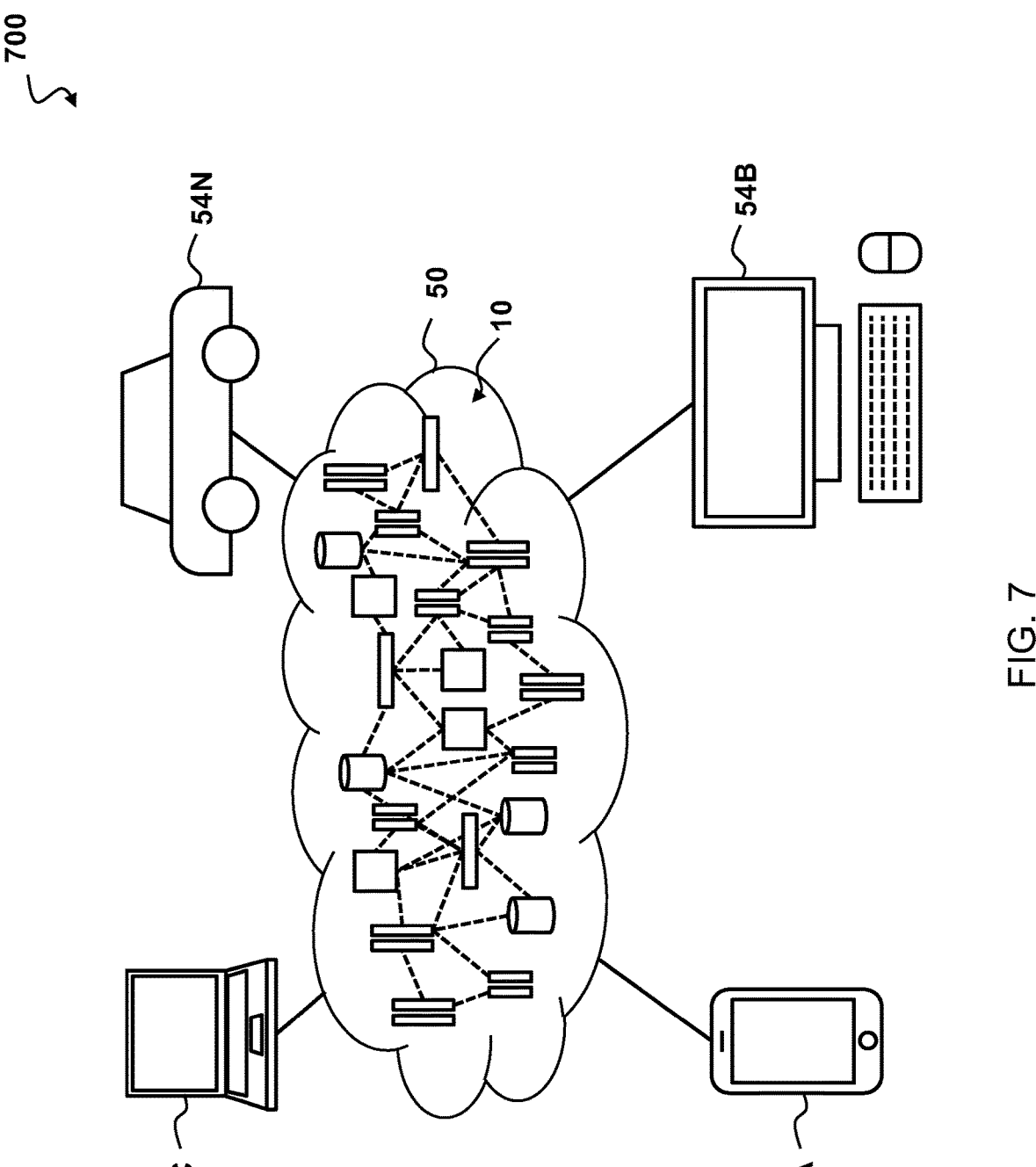
FIG. 7 depicts an illustrative cloud computing environment, according to one embodiment.

Referring now to FIG. 7, illustrative cloud computing environment 50 is depicted in embodiment 700. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that cloud computing nodes 10 and cloud computing environment 50 can communicate with any type of computerized device over any type of network and/or network addressable connection (e.g., using a web browser).

Figure 8:
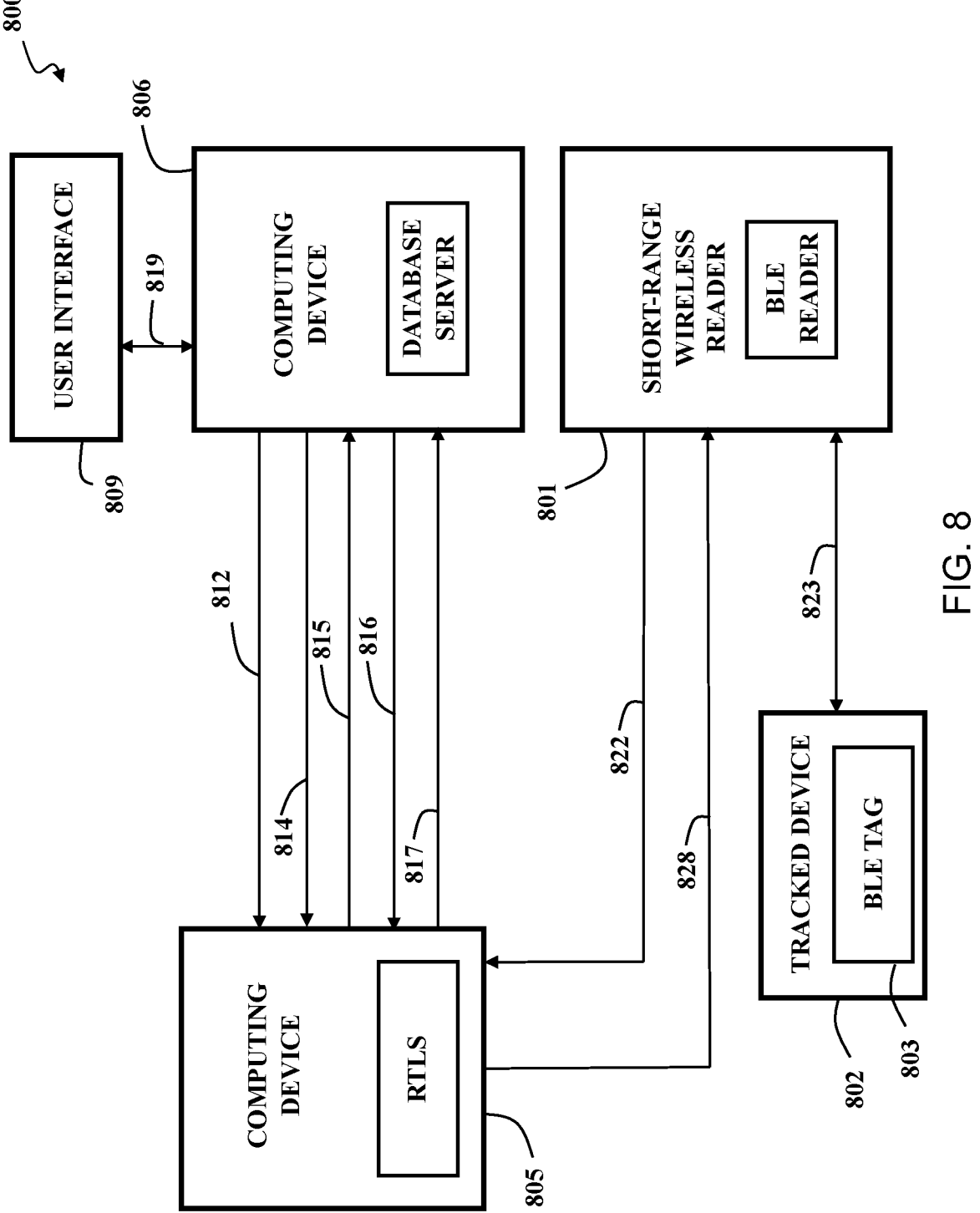
FIG. 8 depicts, in a functional block diagram, a communication sequence of messages for locating and tracking devices.

FIG. 8 depicts a set of nodes and data flow in an embodiment of the inventory management via an equipment tracking system 800 that includes a set of short-range wireless reader devices, e.g., Bluetooth Low Energy (BLE) reader 801, a tracked device 802 where the tracked device 802 may include a short-range wireless tag, BLE tag 803, collocated with the tracked device 802, connected with a computing device that includes a server, e.g., RTLS 805, via a switch which connects a set of devices in a network to each other (not shown), a computing device that includes a database server 806, where, at each node, computer instructions are present to execute a set of applications. As illustrated herein in FIG. 8, the short-range wireless reader includes a BLE reader 801, the RTLS 805 is located in a computing device, and the database server 806 is located on another computing device.

In one embodiment, the BLE readers and BLE tags use a wireless personal area network technology to provide considerably reduced power consumption and cost compared to the original Bluetooth technology, while maintaining a similar communication range, however, as mentioned previously, any short-range wireless technology may be implemented. In one embodiment, the RTLS 805 may be configured to communicate with the one or more short-range wireless, BLE readers 801, placed within a finite space, via a switch.

The computing device having a database server 806 may be coupled to a user interface 809 and may communicate with the RTLS 805 component via a socket connection and transmit/send data to the computing device RTLS 805. In some embodiments, the database server 806 may initiate the execution of an application on the RTLS 805 via a command 812 that may include a request for continual transmission of GPS, Bluetooth, and/or Wi-Fi location data by the RTLS 805 as the data is being collected from the tracked device 802. That is, in one embodiment, the transmission may be in real-time and as soon as data is collected (similar to push notifications), in other embodiments, the RTLS 805 may collect the data and transmit them in intervals that is different than the intervals in which they were collected. For example, the data may be collected in real-time or at intervals N, where the transmission of the data may be at intervals N+x or N−x where x is any measurement of time. The transmission of data that may not be at the regular intervals of receiving the data, may provide security protection in that the database server, or any user/user device outside the security ring, would not necessarily have detailed (or potentially private) information about the equipment being tracked. The transmission intervals may then be programmable so that the user renting the equipment may be able to set how often their usage data is transmitted to outside of the company. In one embodiment, once the BLE reader 801 has received a reading of a BLE tag, the location data may be transmitted via a location data signal 822 to the RTLS 805 for processing. Optionally, other associated information and attributes may also be included as part of the collected and transmitted location data.

In this embodiment, the one or more short-range wireless readers, BLE reader 801, may be configured to receive signals 823 from a short-range wireless tag device, BLE tag 803, where the short-range wireless tag device may be configured to transmit short-range wireless signals and associated with a desired tracked device 802. Although a typical communication method between the BLE reader 801 and RTLS 805 is one without a return acknowledgement to reduce network traffic, in one embodiment, the RTLS 805 may acknowledge receipt of the location data by sending a subsequent transmission 828. The RTLS 805 may then measure signal metrics from the one or more short-range wireless readers, e.g., BLE reader 801 received via the location data signal 822 and transmit the measured signal metrics to the database server 806. This step may include sending the relative location information associated with the BLE reader 801 via a signal 815, the signal including the relative location information such as date/time stamp, a unique short-range wireless tag identification number, a signal strength measurement, and a signal angle, to the database server 806—if available and even if previously sent. In one embodiment, the RTLS 805 may determine whether the location information has changed since the last time it was transmitted and if no modifications to the location are present, not transmit the location information signal 815, thereby reducing network traffic.

In another embodiment, the database server 806 may transmit a signal 814 to the RTLS 805 requesting measured signal metrics and a provided static environmental coordinate of a received short-range wireless tag device according to said coordinate system. In this embodiment, with the database server 806 having received the relative location information signal 815, the database server 806 may optionally send an acknowledgement 816, to the RTLS 805. Optionally, the RTLS 805 may send updates to any location information previously sent via sending a signal 817 based on having received the acknowledgement 816 for a particular tracked device 802.

In one embodiment, the database server 806 may be configured to establish a coordinate system origin and plot location based on the received relative location information signal 815. The database server 806 may further be configured to compare the determined short-range wireless tag coordinates received from the RTLS 805 with a predetermined radius value and a set of environmental coordinates related to known locations within the finite space, and modify the received short-range wireless tag coordinates to match those of the provided static environmental coordinate that the short-range wireless tag coordinates fell within the radius value distance.

In one embodiment, via a user interface 809, the database server 806 may transmit a signal 819 to and display on a client portal, a plotted representation of the modified short-range wireless tag coordinates, overlaid onto a client provided static environment, thereby wirelessly locating and tracking a multitude of devices in real-time within a finite space and graphically representing the location of said devices.

In some embodiments, the server may execute a set of one or more applications via an OS that may be running on the server. The application set may function in a way so as to have access to a set of resources on the device, e.g., access to memory and to operating system services, according to a set of rules which may be defined per application, per set of applications, or per server. The set of applications may be executed in an environment where the server is in communication with a plurality of client mobile devices. In some embodiments, the server OS may assign the URLs to each application and the client may direct the HTTP request to the URL that is associated with the application. Optionally, once an application has terminated, for example, after successful completion or terminal failure—the application may return a response to the client. In exemplary embodiments, the client may be external to the server and optionally, the client may be outside of a network firewall. In the exemplary embodiments where the client may be outside of a network firewall, an HTTP encapsulation method may be used to access the server.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
detecting one or more short-range wireless readers placed within a finite space, wherein the one or more short-range wireless readers are in communication with a Real-Time Location Server (RTLS);
collocating a short-range wireless tag device configured to transmit short-range wireless signals with a desired tracked device;
collecting, by the RTLS server, signal metrics from the one or more short-range wireless readers;
determining short-range wireless tag coordinates of the short-range wireless tag device based on a coordinate system origin and plot location, the received collected signal metrics, and a provided static environmental coordinate associated with the short-range wireless tag device according to the coordinate system;
transmitting the determined short-range wireless tag coordinates to a database server;
comparing, by the database server, the determined short-range wireless tag coordinates with a predetermined radius value associated with a set of static environmental coordinates related to one or more known device bench locations within the finite space; and
modifying the determined short-range wireless tag coordinates to match those of the provided static environmental coordinate, wherein the modified short-range wireless tag coordinates are located within the predetermined radius value thereby wirelessly locating and tracking a number of tracked devices in real-time within the finite space;
wherein if the database server does not receive an expected short-range wireless tag location within a specified amount of time, the database server begins interrogating a collocated Internet of Things (IOT) device for location information.

2. The method of claim 1, further comprising:
transmitting, by the database server, to a client portal, a plotted representation of the modified short-range wireless tag coordinates, overlaid onto a client provided static environment.

3. The method of claim 1, wherein the one or more short-range wireless readers comprise a plurality of Bluetooth® readers.

4. The method of claim 1, wherein the short-range wireless tag device is a Bluetooth® tag device.

5. The method of claim 1, further comprising:
transmitting, by the short-range wireless tag device, signal metrics specific to the short-range wireless tag device to the one or more short-range wireless readers.

6. The method of claim 5, wherein the collected signal metrics transmitted by the short-range wireless tag device comprise at least one of: a date/time stamp, a unique short-range wireless tag identification number, a signal strength measurement, and a signal angle.

7. The method of claim 1, wherein the coordinate system comprises X, Y, and Z axis values.

8. The method of claim 1, further comprising:
disregarding the short-range wireless tag coordinates if the short-range tag coordinates are located outside the predetermined radius value of the set of static environmental coordinates.

9. The method of claim 1, wherein location and quantity of the one or more short-range wireless readers to track the desired tracked device in the finite space are determined based on a predetermined minimum value and a predetermined maximum value that is based on a square-footage of the finite space.

10. The method of claim 1, wherein if the collocated IoT device is not detected for specific tracked device, the database server searches for an alternative tracked device that is still transmitting location information of the short-range wireless tag device.

11. The method of claim 10, wherein if the database server receives a short-range wireless tag location of a specific tracked device outside of a specified range or perimeter, the database server begins interrogating the collocated IoT device for location information, and wherein if the collocated IOT device is not detected for the tracked device, the database server transmits a notice of at least one of: an unauthorized removal and a theft.

12. The method of claim 1, further comprising:

comparing the determined short-range wireless tag coordinates with a predetermined radius value, wherein the predetermined radius value is a minimum distance value;

associating the determined short-range wireless tag coordinates with the static environmental coordinates, if the determined short-range wireless tag coordinates fall within the minimum distance value; and disregarding the determined short-range wireless tag coordinates, if the determined short-range wireless tag coordinates fall outside of the minimum distance value.

13. The method of claim 12, wherein if the determined short-range wireless tag coordinates fall outside of the minimum distance value, using location coordinates of a known associated tracked device instead, thereby predicting coordinates of the tracked device being at possible locations having a higher likelihood of physical correlation with the provided static environment.

\* \* \* \* \*